United States Patent
Dolmeta et al.

(10) Patent No.: US 6,288,673 B1
(45) Date of Patent: Sep. 11, 2001

(54) ACTIVE ANTENNA WITH ARRAY OF RADIATING ELEMENTS WITH REDUNDANT ARCHITECTURE

(75) Inventors: Florence Dolmeta, Cugnaux; Philippe Voisin, Tournefeuille, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/403,994

(22) PCT Filed: May 4, 1998

(86) PCT No.: PCT/FR98/00890

§ 371 Date: Oct. 29, 1999

§ 102(e) Date: Oct. 29, 1999

(87) PCT Pub. No.: WO98/50979

PCT Pub. Date: Nov. 12, 1998

(30) Foreign Application Priority Data

May 5, 1997 (FR) .................................................. 97 05508

(51) Int. Cl.$^7$ ................................ H01Q 3/02; H01Q 3/12
(52) U.S. Cl. ................................................ 342/374; 342/372
(58) Field of Search .................................... 342/368, 372, 342/374; 455/8

(56) References Cited

U.S. PATENT DOCUMENTS

| | | | |
|---|---|---|---|
| 4,187,506 | * 2/1980 | Dickinson | 343/100 R |
| 4,626,858 | * 12/1986 | Copeland | 342/374 |
| 4,837,580 | * 6/1989 | Frazita | 342/374 |
| 4,904,831 | 2/1990 | Nathanson et al. | 200/269 |
| 4,949,090 | 8/1990 | Tamii et al. | 342/173 |
| 5,083,131 | 1/1992 | Julian | 342/372 |
| 5,517,200 | 5/1996 | McAdam et al. | 342/360 |

FOREIGN PATENT DOCUMENTS

| | | | |
|---|---|---|---|
| 0 523 422 A1 | 1/1993 | (EP) | H01Q/3/44 |
| 0 654 574 A1 | 7/1995 | (EP) | H01Q/3/26 |
| 2 013 983 A | 8/1979 | (GB) | H01Q/3/26 |

* cited by examiner

*Primary Examiner*—Dao Phan
(74) *Attorney, Agent, or Firm*—Sughrue, Mion, Zinn, Macpeak & Seas, PLLC

(57) ABSTRACT

Transmit and/or receive antenna comprising an array (10) of radiating elements (12) and a controller for controlling the amplitude and/or the phase of the signals transmitted or received by each element so that the antenna is able to transmit or receive according to a specified pattern. The array (10) comprises an excess number (N+Q) of radiating elements relative to the requirements and the antenna includes a control device for activating the number (N) of elements which is just necessary to meet the requirements. This control device activates a reserve element ($12_{N+1}, \ldots, 12_{N+Q}$) should failure of an active element be detected.

12 Claims, 2 Drawing Sheets

ACTIVE ANTENNA WITH ARRAY OF RADIATING ELEMENTS WITH REDUNDANT ARCHITECTURE

BACKGROUND OF THE INVENTION

The invention relates to an active antenna with an array of radiating elements with a redundant architecture.

Various types of antennas are used to transmit or receive electromagnetic radiation, especially in the microwave frequency region, depending on requirements. The active antenna with an array of radiating elements is of special interest since it provides a transmit or receive pattern which can be configured at will; it can also generate several transmit or receive patterns.

The elements of the array of the same antenna are, generally, of the same type, that is to say they are all planar, horn-shaped, dipoles, helices, etc. The amplitude and the phase of the feed signal to each element determine the characteristics of the radiation pattern.

A beam-forming network is provided in order to feed the elements. This network includes phase shifters and possibly attenuators. The number of outputs of this array is equal to the number of elements. Each output is connected to an element by a power amplifier and, possibly, a filter. In the case of a receive antenna, a low-noise amplifier is provided instead of a power amplifier. The channel associated with a radiating element is termed an active subsystem.

The beam-forming network supplies each element with a signal whose amplitude and phase are matched to the desired radiation pattern.

In certain antennas, the programming of the beam-forming network can be modified. In this case, the network is said to be active. In the converse case (i.e. if the programming cannot be modified), the network is said to be passive.

Such antennas are used in particular on board vehicles, especially satellites or spacecraft. For on-board applications, such as space applications, it is necessary to limit the effects of any equipment failures on the performance of the antenna, i.e. to enable the antenna to meet specifications over a determined lifetime despite an anticipated occurrence of equipment failures.

The deterioration which may arise on account of equipment failures include, for a transmit antenna, a reduction in the Equivalent Isotropic Radiated Power (EIRP), for reception, the G/T ratio (where G is the gain and T the noise temperature of the antenna) and, in both cases, an upturn in the sidelobes, that is to say a deterioration in the specified transmit or receive pattern.

In general, equipment failures occur in the active subsystems.

Various solutions have been used hitherto to maintain the EIRP or the G/T coefficient of the antenna and its pattern within acceptable limits.

For transmit antennas, a first solution consists in uprating the power amplifiers and having them deliver a power greater than the specifications. However, excessive energy consumption is never desirable, especially in a space application. Moreover, with this solution it is not possible to correct the upturns in the sidelobes caused by equipment failures.

A second solution, which is applicable to transmission and to reception, consists in providing a number of radiating elements which is greater than what is strictly required. For example if, to meet the specifications, a number N of radiating sources is necessary, then a number Q is added to make provision for equipment failures. This solution also has the drawback of excess energy consumption at the beginning of the life of the antenna.

Moreover, if the beam-forming network is passive, that is to say if the amplitude and the phase of the feed signal to each element are not controllable, the initial performance must be better than what is strictly required so that the antenna can withstand equipment failures. This constraint necessitates uprating and usually cannot compensate for the effects of equipment failures; in particular, sensitive performance factors such as the level of the sidelobes are degraded with no possibility of compensation. If the beam-forming network is active, the antenna can be reconfigured after equipment failures; however, in this case, the abovementioned drawback of excess energy consumption at the beginning of the life of the antenna still remains.

In a third solution, the amplifiers and, optionally, the beam-forming network employ redundancy. For example, a number of reserve amplifiers are provided to replace defective amplifiers. In order for the wiring to remain within reasonable limits, in terms of simplicity and of bulk, each reserve amplifier can replace only a very limited number of active amplifiers. This constraint makes it impossible to minimize the number of reserve amplifiers. Moreover, replacement requires additional equipment such as switching elements, thus rendering the embodiment more complex and increasing the mass and the cost as well as the bulk. Although this solution theoretically makes it possible to maintain performance, it is not always satisfactory since the increase in mass and bulk are not optimal, especially for space applications.

SUMMARY OF THE INVENTION

The invention remedies these drawbacks.

It makes it possible to preserve optimal transmission and/or reception performance with a minimum increase in mass and bulk.

The antenna according to the invention is characterized in that the transmitter (or receiver) array includes a number of elements and of associated active subsystems which is greater than the requirements for transmission (or reception), and in that, whilst operating, the number of elements, and hence of active subsystems, used is equal to the requirements.

Thus, in the case of transmission, both at the beginning of the life of the antenna (before equipment failures), and also subsequently, there is no need to provide for excess energy consumption.

When an active subsystem fails, the active subsystem of one (or more) previously unused element(s) is(are) activated. The location of this activated element is chosen so that transmission (and/or reception) continues to meet the requirements. In other words, the possibility of maintaining performance is facilitated by the additional degree of freedom constituted by the choice of the location of the replacement element. This property is especially important when the feed amplitude and phase of the elements cannot be modified (that is to say when the beam-forming network is passive) since, if this choice were not available, there would be a risk of the performance of the antenna being degraded despite the activation of an element after the failure of another element.

The increases in mass and in complexity associated with the invention are less than the corresponding increases for prior art antennas which offer good resistance to equipment failures. This is because the number of reserve active subsystems is minimized.

Thus, according to one feature of the invention, the number of reserve elements and their feeds is equal to the minimum number necessary to meet the requirements, provision being made for equipment failures which may occur during the lifetime of the antenna.

An antenna according to the invention meets all the specified requirements. Starting from a full array which is slightly oversized with respect to requirements, Q sources are eliminated to guarantee the specified radiation performance, after elimination, by optimizing the radiation pattern using for example the method described in one of the following articles:

Y. T. LO and S. W. LEE: "A study of space-tapered arrays", IEEE Trans. Antennas Propagat., vol AP-14, No. 1, January 1966, pages 22–30;

B. D. STEINBERG: "The peak sidelobe of the phased array having randomly located elements", IEEE Trans. Antennas Propagat., vol AP-20, No. 2, March 1972, pages 129–136;

M. I. SKOLNIK, J. W. SHERMAN III and F. C. OGG Jr.: "Statistically designed density-tapered arrays", IEEE Trans. Antennas Propagat., vol AP-12, March 1964, pages 408–417;

Y. TSUNODA and N. GOTO: "Sidelobe suppression of planar arrays antennas by the multistage decision method", IEEE Trans. Antennas Propagat., vol AP-35, No. 9 September 1987, pages 1017–1021;

T. NUMAZAKI, S. MANO, T. KATAGI and M. MIZUSAWA: "An improved thinning method for density tapering of planar arrays antennas", IEEE Trans. Antennas Propagat., vol AP-35, No. 9 September 1987, pages 1066–1070.

The antenna obtained after the calculation performed using the optimization method requires a number N of active sources to satisfy the requirements. The Q eliminated sources are regarded as nominally unnecessary.

The unnecessary sources are equipped with the same electronics as the necessary ones, but each unnecessary source is nominally inactive. This type of redundancy is termed "cold redundancy". As indicated above, the electronics of the sources are activated only on the appearance of an equipment failure. The number of sources activated is equal to the number of failed sources for example. The activated sources are chosen to guarantee that the radiating performance meets the specifications in all cases.

BRIEF DESCRIPTION OF THE DRAWING

Other features and advantages of the invention will become apparent from the description of certain of its embodiments given with reference to the appended drawings, in which.

DETAILED DESCRIPTION OF THE INVENTION

Figure 1:
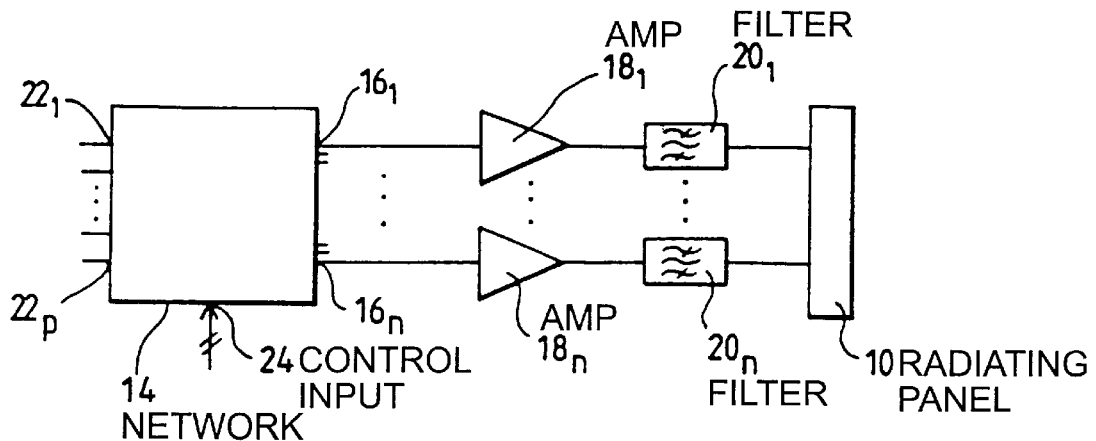
FIG. 1 is a diagram of an active array antenna.

The known principle of an antenna with a panel of radiating elements (transmitters or receivers) will firstly be described in conjunction with FIG. 1. This description relates to a transmit antenna, but the manner in which these principles may be applied to a receive antenna will be indicated.

Figure 2:
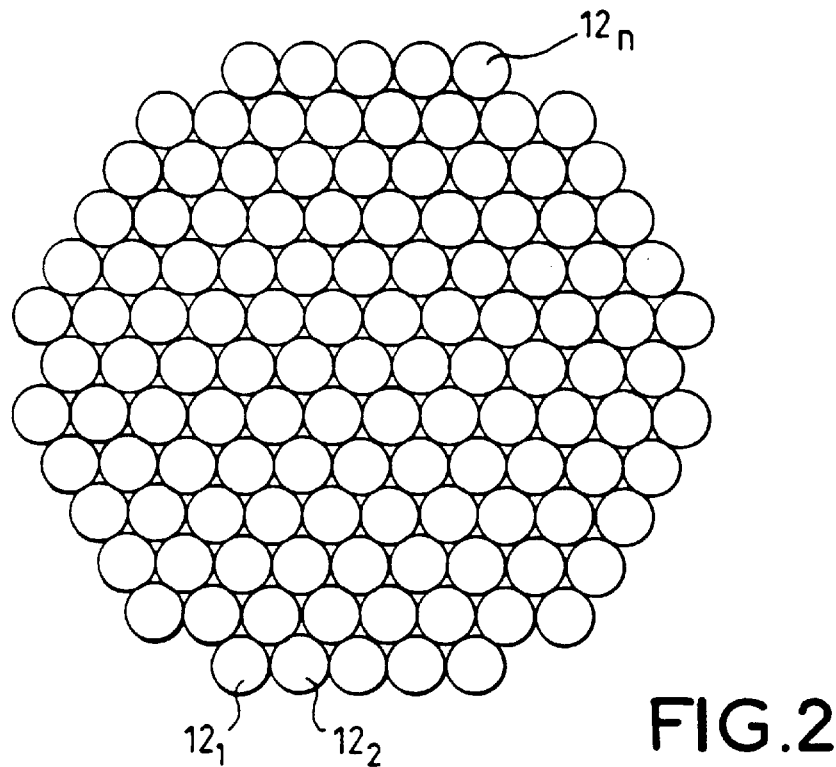
FIG. 2 is a diagram of a prior art panel of radiating elements.

The microwave-frequency electromagnetic waves are radiated by a radiating panel 10 comprising a plurality of radiating elements $12_1$, $12_2$ . . . , $12_n$ (FIG. 2). In this example, the elements 12 have a circular shape. They are 151 in number. They are all in the same plane. However, another shape of surface could be suitable.

The elements are fed according to an amplitude and phase law making it possible to obtain the desired transmit (or receive) pattern for the antenna.

For this purpose, the antenna includes a beam-forming network 14. It has n outputs $16_1$, $16_2$, . . . $16_n$. Each output $16_i$ is connected to the corresponding radiating element $12_i$ by a power amplifier $18_i$ and a filter $20_i$.

The network 14 also has p inputs $22_1$, . . . , $22_p$, p being equal to 5 in this example. Each input corresponds to the activation of a pattern.

When a pattern is activated via an input $22_j$, the network 14 delivers a feed amplitude and phase law which corresponds to a specified transmission (or reception) pattern $D_j$. Each pattern corresponds to transmission to a specified location, called a spot. An activation signal can also be applied simultaneously to several activation inputs 22 so as to transmit several patterns simultaneously.

If for each pattern $D_j$ the programming of the network 14—that it to say the set $_j$ of signals delivered on the outputs 16—cannot be modified, the network is said to be passive. If the programming can be modified, by way of a control input 24, the network is said to be active.

A receive antenna has the same structure with the following differences: the energy is sent, in the opposite direction to transmission, from the panel 10 to the network 14, via low-noise amplifiers (not shown).

One embodiment of the invention will now be described with reference to FIGS. 3 and 4. In these figures, the same reference numerals as those of FIGS. 1 and 2 are used for similar components.

In order to make provision for equipment failures which may arise during a specified lifetime of the antenna, the panel 10 includes N+Q radiating elements. The number N is the number of elements and associated active subsystems needed to satisfy correctly the transmission requirements, that is to say transmission with the required pattern and the desired power, and no more.

During operation, only these N elements—and the associated active subsystems—are used, the active subsystems of the Q remaining elements normally being inactive.

These Q elements and their active subsystems constitute a reserve which is used as and when required, when any of the N first active subsystems are defective.

Figure 3:
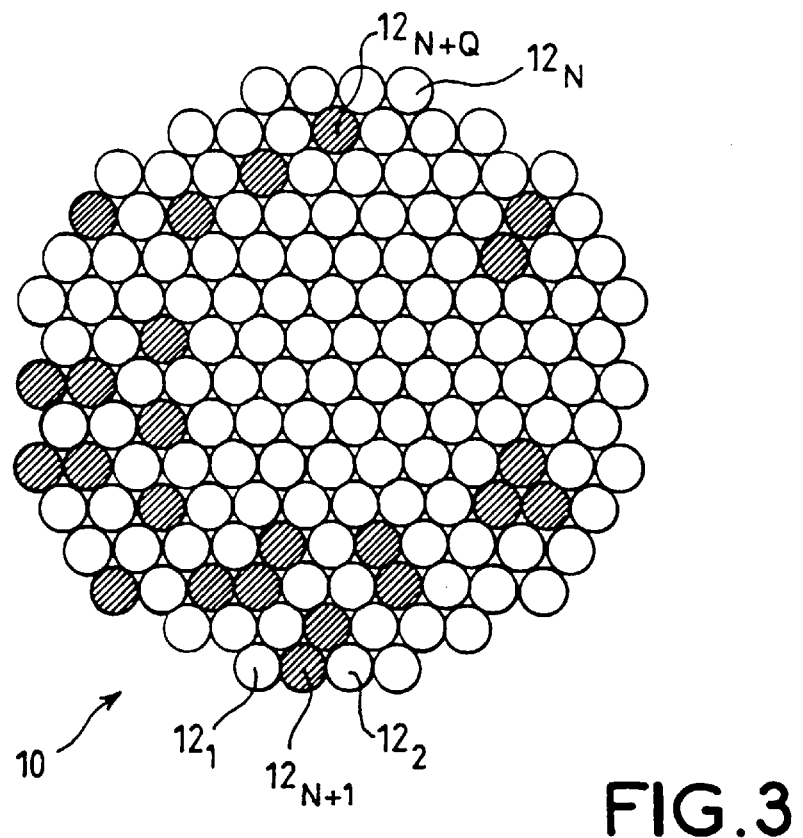
FIG. 3 is a diagram similar to that of FIG. 2, but for a panel according to the invention.

In FIG. 3, the active elements $12_1$, $12_2$, . . . , $12_N$ are represented in white and the reserve elements $12_{N+1}$, . . . , $12_{N+Q}$ are cross-hatched.

In this example, the number N is 127 and the number Q is 24.

Figure 4:
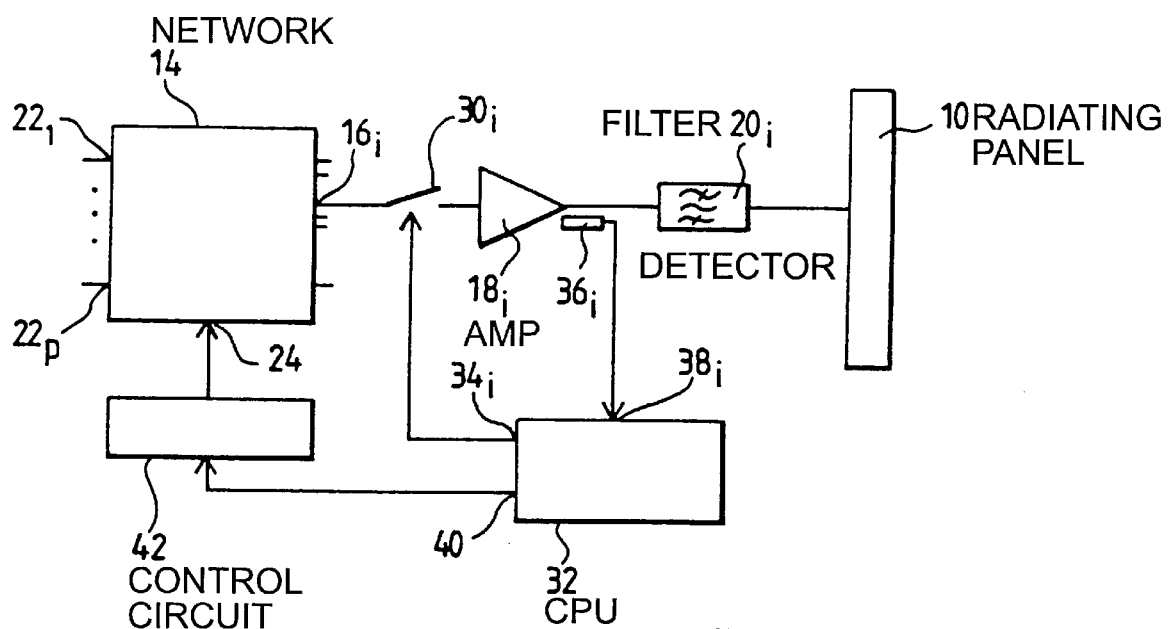
FIG. 4 is a diagram of an antenna in accordance with the invention.

Each radiating element $12_i$—active or in reserve—is associated with an amplifier $18_i$ and a filter $20_i$ (FIG. 4).

Activation (and inactivation) is carried out by energizing (or de-energizing) the active subsystems of the antenna. In this example, activation (or inactivation) is achieved by a switch $30_i$ in series between the output $16_i$ of the network 14 and the amplifier $18_i$. The switch is controlled by an output $34_i$ of a central processing unit 32.

A failure and/or calibration detector $36_i$ connected to the output of each amplifier $18_i$ sends a signal indicative of the power of the signal output by the amplifier $18_i$ to an input $38_i$ of the central processing unit 32.

Since the beam-forming network is active in this example, an output 40 of the central processing unit 32 is connected to the input of a circuit 42 for controlling reconfiguring of the beam-forming network 14. The output of the circuit 42 is connected to the input 24 of the network 14.

A radiating element $12_i$ is active when the corresponding switch $30_i$ is closed, that it to say when the associated active subsystem is energized; it is inactive when this switch is open, that is to say when the active subsystem is de-energized.

At the beginning of the life of the antenna, the locations of the inactive elements $12_{N+1} \ldots 12_{N+Q}$—whose corresponding switches $30_i$ are open—are chosen so as to make provision in particular for future possibilities of equipment failure, for the expected lifetime of the antenna and for its use during this lifetime.

When a detector $36_i$ informs the central processing unit 32 that the corresponding activated element $12_i$ is receiving no signal or an incorrect or insufficient signal, this central processing unit 32 instructs the closing of a switch $30_j$, which was previously open, so as to activate the corresponding reserve radiating element $12_j$. In other words, the central processing unit switches off the defective active subsystem and switches on a subsystem which was previously in reserve. For this purpose, a program is provided in the memory of the central processing unit which makes it possible to supply a new set of signals on the outputs 16 of the network 14. Thus this program, making provision for the inactivated element i, chooses the element j to be activated and redistributes the N active signals over the outputs 16 in such a way as to obtain the desired transmit pattern despite the equipment failure.

In a variant embodiment with a passive beam-forming network, i.e. one in which the feed amplitude and phase laws are not controlled—should there be an equipment failure, only the geometry of the antenna is reconfigured, that is to say the radiating elements are redistributed by redistributing the corresponding active subsystems to obtain the desired pattern.

In the case of an active beam-forming network, after an equipment failure, the amplitude and phase control laws are electronically reprogrammed, that is to say both a geometrical redistribution and an electronic modification are performed.

In the case of an on-board antenna, the redistribution (or reconfiguration) programs are either carried on board or remote controlled from a control station.

This type of prevention of failures of active array antennas proves to be the only satisfactory solution for antennas producing fixed spots and whose feed amplitude and phase laws are immutable (passive beam-forming network). As these antennas have no electronic configurability, the loss of sources would signify an outright loss of radiation performance. The solution in accordance with the invention of a thinned antenna with cold redundancy has the advantage of offering physical reconfigurability, which makes it possible to make good or compensate for degradation.

The EIRP requirements are satisfied without uprating the radiated power, and hence the power consumption, to compensate for degradation related to the occurrence of equipment failures.

When dealing with an antenna with an active beam-forming network, the redundancy according to the invention offers an additional degree of freedom for reconfiguring the antenna in the event of equipment failure, this result being achieved with less increase in mass and complexity than the corresponding prior art solutions.

The antenna according to the invention, which includes elements that are nonactive but can be activated when required, is said to have "cold redundancy".

The reserve elements and their feeds are identical to the active elements and their feeds.

The dimensions of the panel 10 (FIG. 3) of the antenna in accordance with the invention are only slightly greater than those of a conventional panel meeting the same transmission (or reception) requirements. Comparison of FIGS. 2 and 3 indicates the order of magnitude of the oversizing.

The performance of the antenna can be maintained during its lifetime.

It is not necessary to transmit excess power in order to make provision for future equipment failures.

The freedom to choose the location of the active elements makes it possible, as compared with an antenna of the FIG. 2 type, to obtain radiation performance levels which are always optimized, at the beginning of the life of the antenna and also in the event of equipment failure.

In other words, the antenna according to the invention has an additional degree of freedom (the location of the replacement element), which is added to the choice of the phase of the radiating element. This antenna is thus very resistant to failures, and its performance can be optimized, both on transmission and also on reception.

What is claimed is:

1. Transmit and/or receive antenna comprising:
   an array of radiating elements, said radiating elements numbering N+Q;
   a control device which activates N radiating elements of said array and includes means for controlling amplitude and/or phase of signals transmitted or received by each active radiating element so that the antenna transmits or receives according to a specified pattern;
   a plurality of detectors, each detector of said plurality of detector being associated with a respective radiating element of said array, and detecting whether a respective active radiating element is malfunctioning,
   wherein N active radiating elements are a minimum number of elements necessary to meet the requirements of transmitting or receiving said specified pattern at a desired amplitude,
   wherein the Q excess radiating elements are inactive and kept in reserve, and
   wherein said control device activates at least one of the reserve radiating elements when a detector of said plurality of detectors detects failure of a respective active element.

2. Antenna according to claim 1, wherein the control device, when activating said at least one of the reserve radiating elements, selects the location of each reserve element being activated in such a way as to obtain said specified pattern.

3. Antenna according to claim 1, wherein the control device modifies a distribution of the signals transmitted and/or received by each element so as to optimize said specified pattern.

4. Antenna according to claim 1, further comprising a plurality of amplifiers, each amplifier being associated with a respective radiating element of said array, wherein the control device is used to switch each amplifier on or off.

5. Antenna according to claim 1, wherein each detector detects failure of the radiating element associated with the detector or the radiating element's feed.

6. Antenna according to claim 1, wherein each detector of said plurality of detectors comprises a calibration detector associated with a respective feed of each element.

7. Antenna according to claim 1, wherein the number of reserve elements and their feeds is equal to a minimum number necessary to provide for equipment failures which may occur during a lifetime of the antenna, so that the transmission or reception requirements are met over the lifetime of the antenna.

8. Antenna according to claim 1, characterized in that the reserve elements and their feeds are respectively identical to the active elements and to their feeds.

9. Transmit antenna according to claim 1, characterized in that the control device maintains the transmission power substantially constant during the lifetime of the antenna.

10. Antenna according to claim 1, characterized in that the array is in the form of a panel.

11. Antenna according to claim 1, wherein said antenna is utilized to transmit and/or receive signals on board a vehicle.

12. Antenna according to claim 11, wherein the vehicle is a spacecraft or satellite.

* * * * *